US012597564B2

(12) United States Patent
Zenzai et al.

(10) Patent No.: US 12,597,564 B2
(45) Date of Patent: **\*Apr. 7, 2026**

(54) MULTILAYER CERAMIC CAPACITOR AND PASTE FOR PRODUCING BUMP

(71) Applicant: Murata Manufacturing Co., Ltd., Nagaokakyo (JP)

(72) Inventors: Kota Zenzai, Nagaokakyo (JP); Noriko Yamamoto, Nagaokakyo (JP); Yusuke Kamata, Nagaokakyo (JP); Shinobu Chikuma, Nagaokakyo (JP)

(73) Assignee: MURATA MANUFACTURING CO., LTD., Kyoto (JP)

( \* ) Notice: Subject to any disclaimer, the term of this patent is extended or adjusted under 35 U.S.C. 154(b) by 99 days.

This patent is subject to a terminal disclaimer.

(21) Appl. No.: 18/637,603

(22) Filed: Apr. 17, 2024

(65) Prior Publication Data

US 2024/0274362 A1      Aug. 15, 2024

Related U.S. Application Data

(63) Continuation of application No. PCT/JP2022/041547, filed on Nov. 8, 2022.

(30) Foreign Application Priority Data

Nov. 10, 2021    (JP) ................................ 2021-183732

(51) Int. Cl.
*H01G 4/232* (2006.01)
*C09D 11/037* (2014.01)
(Continued)

(52) U.S. Cl.
CPC ......... *H01G 4/2325* (2013.01); *C09D 11/037* (2013.01); *C09D 11/102* (2013.01); *C09D 11/52* (2013.01); *H01G 4/30* (2013.01)

(58) Field of Classification Search
CPC ........ H01G 4/232; H01G 4/248; H01G 4/228; H10G 4/2325; C09D 11/037; C09D 11/102; C09D 11/52
(Continued)

(56) References Cited

U.S. PATENT DOCUMENTS 10,566,137 B2    2/2020  Park et al.
2017/0042029 A1*  2/2017  Nishimura ............... H01G 2/06
(Continued)

FOREIGN PATENT DOCUMENTS

JP          2010226017 A     10/2010
JP          2015204451 A   * 11/2015   ............. H01G 4/008
(Continued)

OTHER PUBLICATIONS

International Search Report in PCT/JP2022/041547, mailed Feb. 14, 2023, 3 pages.
(Continued)

*Primary Examiner* — Arun Ramaswamy
(74) *Attorney, Agent, or Firm* — Keating & Bennett, LLP

(57) ABSTRACT

A multilayer ceramic capacitor includes a multilayer body including a dielectric layer and an inner electrode layer alternately laminated, an outer electrode layer on each of two end surfaces at both ends in a length direction perpendicular to a lamination direction of the multilayer body and covering end surface sides of two main surfaces at both ends in the lamination direction and end surface sides of two side surfaces in the width direction and including a base electrode layer connected to the inner electrode layer, and a bump on each of the two end surface sides to hold therebetween the base electrode layer, covering the main surface side, and including a resin and a metal. In each bump, an end surface-side portion near the end surface on the side where
(Continued)

the bump is located, projects more than a central portion of the bump toward an outside in the lamination direction.

15 Claims, 6 Drawing Sheets

(51) Int. Cl.
 *C09D 11/102* (2014.01)
 *C09D 11/52* (2014.01)
 *H01G 4/30* (2006.01)

(58) Field of Classification Search
 USPC ..................... 361/301.4, 306.3, 321.1, 321.3
 See application file for complete search history.

(56) References Cited

U.S. PATENT DOCUMENTS

| | | | |
|---|---|---|---|
| 2019/0080845 A1 | 3/2019 | Onodera et al. | |
| 2019/0287719 A1 | 9/2019 | Fujita et al. | |
| 2020/0343048 A1 | 10/2020 | Yokomizo | |
| 2021/0035742 A1 | 2/2021 | Hattori | |
| 2021/0202175 A1* | 7/2021 | Park | H01G 4/248 |

FOREIGN PATENT DOCUMENTS

| | | |
|---|---|---|
| JP | 2015216337 A | 12/2015 |
| JP | 2019050278 A | 3/2019 |
| JP | 2020181962 A | 11/2020 |
| JP | 2021027054 A | 2/2021 |
| WO | 2018101405 A1 | 6/2018 |

OTHER PUBLICATIONS

Written Opinion in PCT/JP2022/041547, mailed Feb. 14, 2023, 3 pages.
Zenzai, "Multilayer Ceramic Capacitor and Bump-Producing Paste", U.S. Appl. No. 18/629,015, filed Apr. 8, 2024.

* cited by examiner

MULTILAYER CERAMIC CAPACITOR AND PASTE FOR PRODUCING BUMP

CROSS REFERENCE TO RELATED APPLICATIONS

This application claims the benefit of priority to Japanese Patent Application No. 2021-183732 filed on Nov. 10, 2021 and is a Continuation Application of PCT Application No. PCT/JP2022/041547 filed on Nov. 8, 2022. The entire contents of each application are hereby incorporated herein by reference.

BACKGROUND OF THE INVENTION

1. Field of the Invention

The present invention relates to multilayer ceramic capacitors and pastes for producing bumps.

2. Description of the Related Art

A multilayer ceramic capacitor has an inner layer portion in which a dielectric layer and an inner electrode are alternately laminated. In addition, dielectric layers are disposed as outer layer portions above and below the inner layer portion, forming a rectangular parallelopiped-shaped multilayer body. In addition, outer electrodes are provided on both end surfaces in the longitudinal direction of the multilayer body, forming a capacitor main body.

Further, known is a multilayer ceramic capacitor in which in order to suppress the occurrence of a so-called "squeak", a bump is formed so as to cover a portion of an outer electrode on the side, mounted on a substrate, in a capacitor main body (see, for example, Japanese Unexamined Patent Application Publication No. 2015-216337).

SUMMARY OF THE INVENTION

A solder is used for attaching a multilayer ceramic capacitor, including a bump, to a substrate. In this case, when the solder forms a fillet along the side surface of the bump and reaches the capacitor main body, a squeak is easily transmitted to the substrate, decreasing the squeak preventing effect.

Example embodiments of the present invention provide multilayer ceramic capacitors each capable of improving a squeak preventing effect and provide pastes for producing bumps.

A multilayer ceramic capacitor according to an example embodiment of the present invention includes a multilayer body including a dielectric layer and an inner electrode layer alternately laminated, an outer electrode layer on each of two end surfaces at both ends in a length direction perpendicular to a lamination direction of the multilayer body so as to cover end surface sides of two main surfaces at both ends in the lamination direction of the multilayer body and end surface sides of two side surfaces in a width direction perpendicular to the lamination direction and the length direction and which includes a base electrode layer connected to the inner electrode layers, and a bump on each of the two end surface sides of one of the two main surfaces of the multilayer body to hold therebetween the base electrode layer, covering a main surface side, and including a resin and a metal, in which in each of the bumps, the end surface-side portion near the end surface on the side, where the bump is located, projects more than a central portion of the bump to an outside in the lamination direction.

According to another example embodiment of the present invention, a paste for a bump of a multilayer ceramic capacitor includes about 86.5% by weight or more and about 94.1% by weight or less of a metal powder including any one of silver, copper, or nickel and having a median diameter D50 of about 2 μm or more and about 10 μm or less, about 1.13% by weight or more and about 6.38% by weight or less of an epoxy resin, about 0.90% by weight or more and about 5.06% by weight or less of a phenol resin, about 0.0113% by weight or more and about 0.0638% by weight or less of imidazole, and about 1.48% by weight or more and about 3.85% by weight or less of solvent so that a total is 100%.

According to example embodiments of the present invention, multilayer ceramic capacitors each capable of improving a squeak preventing effect and pastes for producing bumps are provided.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Figure 1:
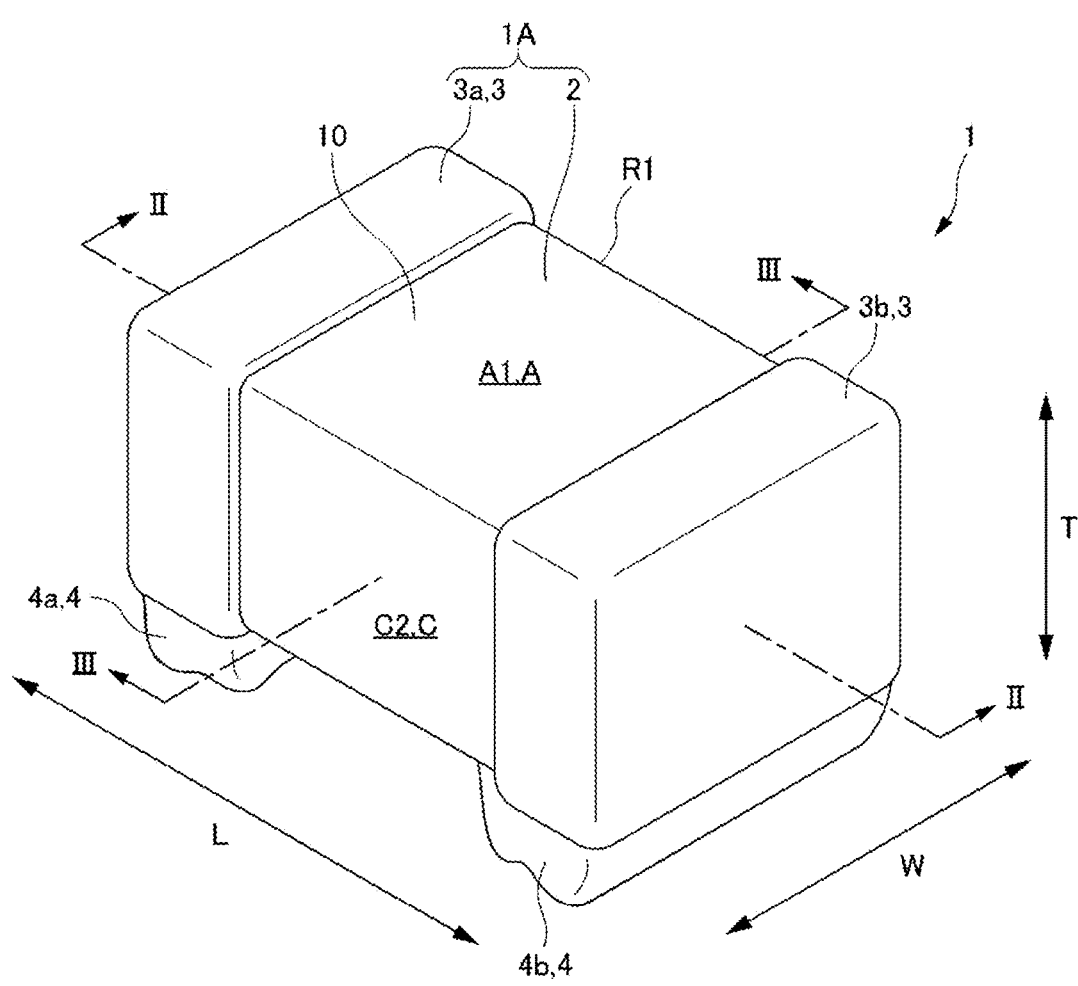
FIG. 1 is a schematic perspective view of a multilayer ceramic capacitor 1 of an example embodiment of the present invention.
Figure 2:
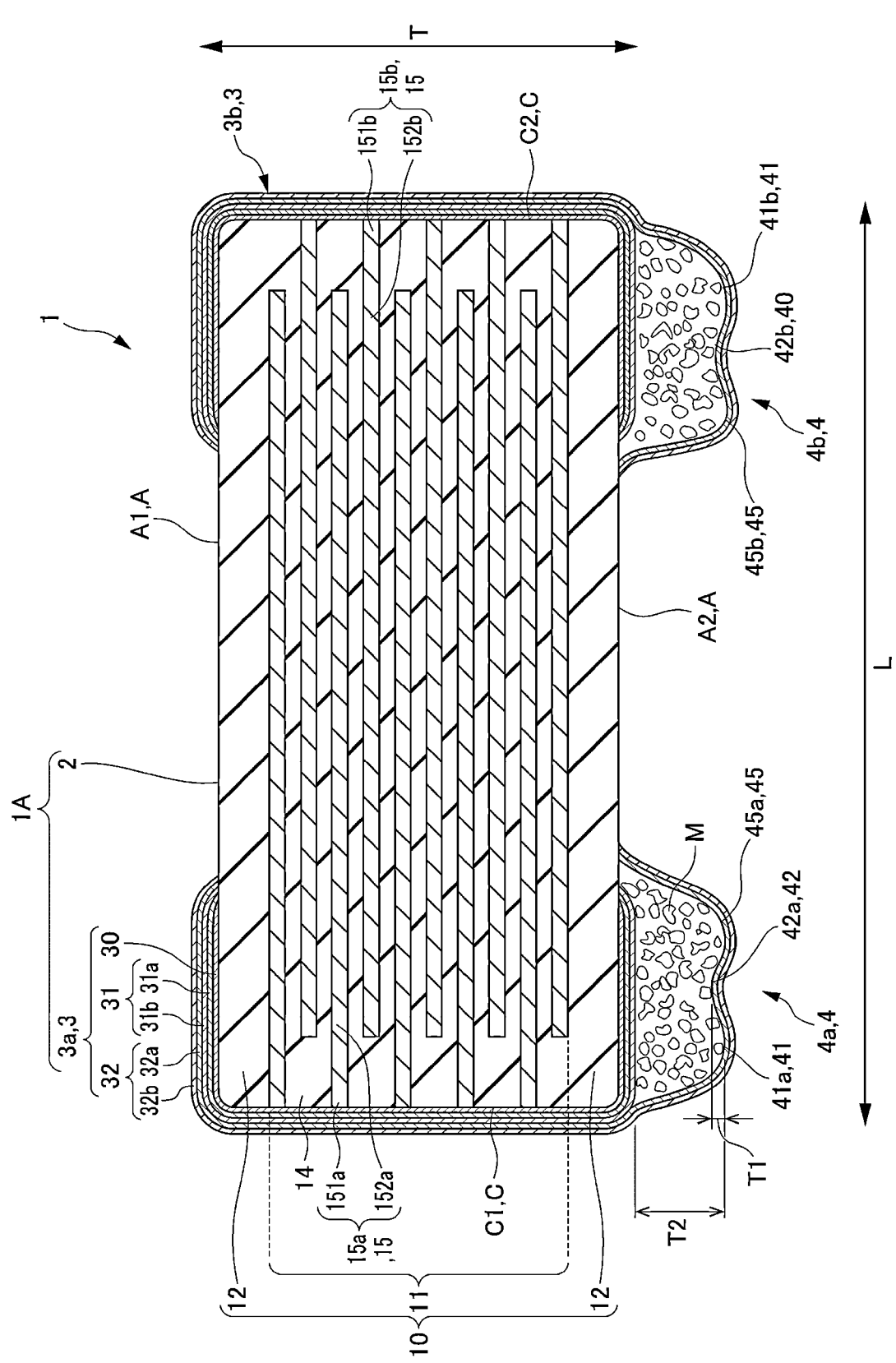
FIG. 2 is a sectional view taken along line II-II in FIG. 1 of a multilayer ceramic capacitor 1 of an example embodiment of the present invention.
Figure 3:
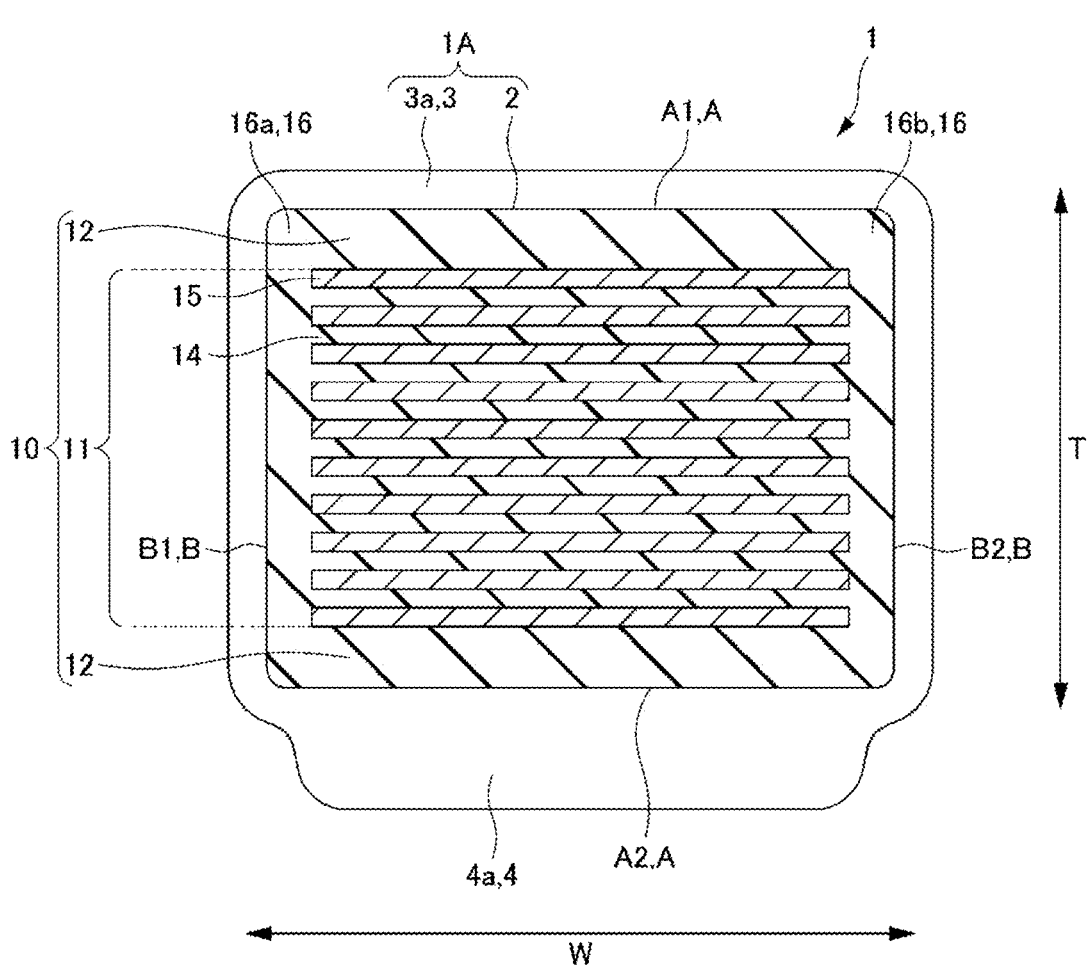
FIG. 3 is a sectional view taken along line III-III in FIG. 1 of a multilayer ceramic capacitor 1 of an example embodiment of the present invention.

A multilayer ceramic capacitor 1 according to an example embodiment of the present invention is described. FIG. 1 is a schematic perspective view of the multilayer ceramic capacitor 1 of the present example embodiment. FIG. 2 is a sectional view taken along line II-II in FIG. 1 of the multilayer ceramic capacitor 1 of the present example embodiment. FIG. 3 is a sectional view taken along line III-III in FIG. 1 of the multilayer ceramic capacitor 1 of the present example embodiment.

The multilayer ceramic capacitor 1 includes a capacitor main body 1A having a substantially rectangular parallelepiped shape and including a multilayer body 2 and a pair of outer electrode layers 3 provided at both ends of the multilayer body 2, and bumps 4 attached to the capacitor main body 1A. Also, the multilayer body 2 includes an inner layer portion 11 including a plurality of pairs of a dielectric layer 14 and an inner electrode layer 15.

In the description below, with respect to the terms representing the directions of the multilayer ceramic capacitor 1, the direction in which a pair of outer electrode layers 3 are provided is referred to as the "length direction L". The direction in which the dielectric layer 14 and the inner electrode layer 15 are laminated is referred to as the "lamination direction T". The direction crossing both the length direction L and the lamination direction T is referred to as the "width direction W". In the present example embodiment, the width direction W is perpendicular to both the length direction L and the lamination direction T.

FIG. 2 shows a section passing through the center of the width direction W of the multilayer ceramic capacitor 1 and extending in the length direction L and the lamination direction T.

Outer Surface of Multilayer Body 2

Among the six outer surfaces of the multilayer body 2, a pair of outer surfaces facing each other in the lamination direction T are respectively referred to as a "first main surface A1" and a "second main surface A2", a pair of outer surfaces facing each other in the width direction W are respectively referred to as a "first side surface B1" and a "second side surface B2", and a pair of outer surfaces facing each other in the length direction L are respectively referred to as a "first end surface C1" and a "second end surface C2". In description, when the first main surface A1 and the second main surface A2 need not be particularly distinguished in description, these surfaces are together referred to as a "main surface A"; when the first side surface B1 and the second side surface B2 need not be particularly distinguished in description, these surfaces are together referred to as a "side surface B"; and when the first end surface C1 and the second end surface C2 need not be particularly distinguished in description, these surfaces are together referred to as a "end surface C".

The multilayer body 2 preferably has a rounded ridgeline portion R1 including a corner portion. The ridgeline portion R1 is a portion where two surfaces, that is, the main surface A and the side surface B, the main surface A and the end surface C, or the side surface B and the end surface C, of the multilayer body 2 cross each other.

Multilayer Body 2

The multilayer body 2 includes a multilayer body main body 10 including an inner layer portion 11 and an outer layer portion 12 disposed on each of both ends in the lamination direction T of the inner layer portion 11, and side gap portions 16 provided at both sides in the width direction W of the multilayer body main body 10.

Inner Layer Portion 11

The inner layer portion 11 includes a plurality of pairs of the dielectric layer 14 and the inner electrode layer 15 which are alternately laminated along the lamination direction T.

The dielectric layer 14 is produced using a ceramic material. For example, a dielectric ceramic including $BaTiO_3$ as a main component is used as the ceramic material.

The inner electrode layer 15 includes a plurality of first inner electrode layers 15a and a plurality of second inner electrode layers 15b. The first inner electrode layers 15a and the second inner electrode layers 15b are alternately disposed. Each of the first inner electrode layers 15a includes a first facing portion 152a facing the second inner electrode layers 15b and a first lead-out portion 151a led out from the first facing portion 152a to the first end surface C1 side. The end portion of the first lead-out portion 151a is exposed in the first end portion C1 and electrically connected to a first outer electrode layer 3a described later. Each of the second inner electrode layers 15b includes a second facing portion 152b facing the first inner electrode layers 15a and a second lead-out portion 151b led out from the second facing portion 152b to the second end surface C2 side. The end portion of the second lead-out portion 151b is electrically connected to a second outer electrode layer 3b described later. Charge is accumulated in the first facing portions 152a of the first inner electrode layers 15a and the second facing portions 152b of the second inner electrode layers 15b.

The inner electrode layer 15 is formed of a metal material represented by, for example, nickel (Ni), copper (Cu), silver (Ag), palladium (Pd), a silver-palladium (Ag—Pd) alloy, gold (Au), or the like.

Outer Layer Portion 12

The outer layer portions 12 are produced using the same material as the dielectric layers 14 of the inner layer portion 11.

Side Gap Portion 16

The side gap portion 16 includes a first side gap portion 16a provided on the side surface B side of the multilayer body main body 10, and a second side gap portion 16b provided on the second side surface B2 side of the multilayer body main body 10. The side gap portion 16 is produced using the same material as the dielectric layers 14.

Outer Electrode Layers 3

The outer electrode layers 3 include a first outer electrode layer 3a provided on the first end surface C1, and a second outer electrode layer 3b provided on the second end surface C2. The outer electrode layers 3 cover not only the end surface C but also a portion of the main surface A and a portion of the end surface C side of the side surface B.

As described above, the end portion of the first lead-out portion 151a of each of the first inner electrode layers 15a is exposed from the first end portion C1 and electrically connected to the first outer electrode layer 3a. Also, the end portion of the second lead-out portion 151b of each of the second inner electrode layers 15b is exposed from the second end portion C2 and electrically connected to the second outer electrode layer 3b. This forms a structure in which a plurality of capacitor elements are electrically connected in parallel between the first outer electrode layer 3a and the second outer electrode layer 3b.

In addition, each of the outer electrode layers 3 includes, for example, a base electrode layer 30, a first plating layer 31, and a second plating layer 32.

The base electrode layer 30 can be formed by using, for example, a conductive metal such as copper, nickel, silver, palladium, a silver-palladium alloy, gold, or the like. Also, the base electrode layer 30 of the present example embodiment includes glass.

The first plating layer 31 includes a first nickel plating layer 31a disposed on the outer periphery of the base electrode layer 30 and a first tin plating layer 31b disposed on the outer periphery of the first nickel plating layer 31a. The second plating layer 32 includes a second nickel plating layer 32a disposed on the outer periphery of the first tin plating layer 31b and a second tin plating layer 32b disposed on the outer periphery of the second nickel plating layer 32a. However, the second plating layer 32 is disposed on the outer periphery of each of the bumps 4 in a next extension portion where the bump 4 is disposed.

Bumps 4

The bumps 4 include a pair of first bump 4a and a second bump 4b. On the second main surface A2 side serving as the substrate mounting surface of the capacitor main body 1A, the first bump 4a is disposed on the end surface C1 side in the length direction L and the second bump 4b is disposed on the other end surface C2 side. As shown in FIG. 2, the first bump 4a and the second bump 4b are separated at a predetermined distance in the length direction L at positions substantially line-symmetrical with respect to a center line therebetween, the line passing through the center of the length direction L and extending in the width direction W.

The bumps 4 are disposed on the second main surface A2 side of the capacitor main body 1A with the respective outer electrode layers 3 interposed therebetween and going around to the second main surface A2 side.

Also, in the second main surface A2, each of the bumps 4 has not only a portion in which the base electrode layer 30, the first nickel plating layer 31a, and the first tin plating layer 31b are extended, but also a portion in direct contact with a portion of the outer layer portion 12 of the multilayer body 2.

In a portion where each of the bumps 4 is not disposed on the capacitor main body 1A, the second nickel plating layer 32a and the second tin plating layer 32b are disposed on the outer periphery of the first in plating layer 31b, while in a portion where each of the bumps 4 is disposed, these layers are disposed on the outer periphery of the bump 4.

Each of the bumps 4 has a recessed central portion 42 in the length direction L. That is, in each of the bumps 4, the end surface side portion 41 near the end surface C on the side, where the bump 4 is disposed, in the length direction L is projected more than the central portion 42 of the bump 4 to the outside in the lamination direction T, which is a lower portion in the drawing. Also, in each of the bumps 4, the end portion 45 on the side opposite to the end surface C on the side, where the bump 4 is disposed, in the length direction L is projected more than the central portion 42 to the outside in the lamination direction T, which is a lower portion in the drawing.

In description of the bump 4a, a central portion 42a in the length direction L of the bump 4a is recessed. In the bump 4a, the end surface side portion 41a near the end surface C1 on the side, where the bump 4a is disposed, in the length direction L is projected more than the central portion 42a of the bump 4a to the outside in the lamination direction T, which is a lower portion in the drawing. Also, in the bump 4a, the end portion 45a on the side opposite to the end surface C on the side, where the bump 4a is disposed, in the length direction L is projected more than the central portion 42 to the outside in the lamination direction which is a lower portion in the drawing.

In the bump 4b, a central portion 42b in the length direction L of the bump 4b is recessed. In the bump 4b, the end surface side portion 41b near the end surface C2 on the side, where the bump 4b is disposed, in the length direction L is projected more than the central portion 42b of the bump 4b toward the outside in the lamination direction T, which is a lower portion in the drawing. Also, in the bump 4b, the end portion 45b on the side opposite to the end surface C on the side, where the bump 4b is disposed, in the length direction L is projected more than the central portion 42 toward the outside in the lamination direction which is a lower portion in the drawing.

In addition, a difference T1 in thickness (distance in the lamination direction T) between the end surface side portion 41 and the central portion 42 in the lamination direction T is about 5% or more and about 30% or less of the thickness T2 of the end surface side portion 41 of each of the bumps 4 in the lamination direction T.

Each of the bumps 4 preferably includes, for example, a plurality of metal powders M as shown in FIG. 2, and in a section of FIG. 2, the metal powders M occupy about 43% or more and about 91% or less of the total area and preferably about 60% or more and about 80% or less of the total area.

The metal powders M include any one of silver, copper, or nickel. Copper includes copper coated with silver, and an alloy of copper and nickel includes an alloy coated with silver. Also, the metal powders M include a tin metal powder. The metal powders M have a median diameter D50 of about 2 μm or more and about 10 μm or less. The median diameter D50 is a diameter at which when the metal powders M are divided into two portions according to size, the amounts on the large side and the small side are equal to each other. The metal powders M need not include a tin metal powder. The type of a metal is detected by using WDX or EDX.

The bumps 4 are produced using a paste including, in terms of % by weight, about 86.5% by weight or more and about 94.1% by weight or less of the metal powders M including any one of silver, copper, or nickel and having a median diameter D50 of about 2 μm or more and about 10 μm or less, about 1.13% by weight or more and about 6.38% by weight or less of an epoxy resin, about 0.90% by weight or more and about 5.06% by weight or less of a phenol resin, about 0.0113% by weight or more and about 0.0638% by weight or less of imidazole, and about 1.48% by weight or more and about 3.85% by weight or less of solvent so that a total is 100%, for example.

Also, the bumps 4 are produced from a paste including, in terms of % by volume, about 45.3% by volume or more and about 64.9% by volume or less of the metal powders M including any one of silver, copper, or nickel and having a median diameter D50 of about 2 μm or more and about 10 μm or less, about 5.94% by volume or more and about 25.5% by volume or less of an epoxy resin, about 4.56% by volume or more and about 19.5% by volume or less of a phenol resin, about 0.0621% by volume or more and about 0.266% by volume or less of imidazole, and about 8.31% by volume or more and about 24.5% by volume or less of solvent so that a total is 100%.

Method for Producing Multilayer Ceramic Capacitor 1

Figure 4:
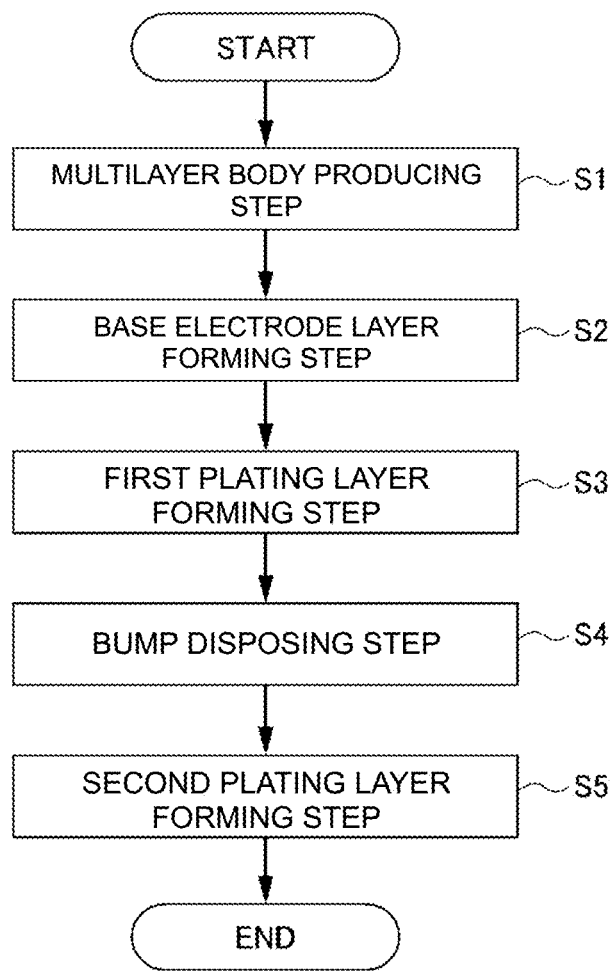
FIG. 4 is a flowchart illustrating a method for producing a multilayer ceramic capacitor 1.

FIG. 4 is a flowchart illustrating an example of a method for producing the multilayer ceramic capacitor 1. The method for producing the multilayer ceramic capacitor 1 includes a multilayer body producing step S1, a base electrode layer forming step S2, a first plating layer forming step S3, a bump disposing step S4, and a second plating layer forming step S5. FIGS. 5A to 5D are drawings illustrating the multilayer body producing step S1, the base electrode layer forming step S2, and the first plating layer forming step S3. FIGS. 6A to 6D are drawings illustrating the bump disposing step S4 and the second plating layer forming step S5.

Multilayer Body Producing Step S1

A ceramic slurry including a ceramic powder, a binder, and a solvent is formed into a sheet shape on the outer periphery of a carrier film using a die coater, a gravure coater, a micro gravure coater, or the like, forming a ceramic green sheet 101 for lamination serving as the dielectric layer 14. Then, a conductor paste is applied in strips on the ceramic capacitor green sheet 101 for lamination by screen printing, ink jet printing, gravure printing, or the like, forming a material sheet 103 having a conductive pattern 102, serving as the inner electrode layer 15, printed on the surface of the ceramic green sheet 101 for lamination.

Figure 5A:
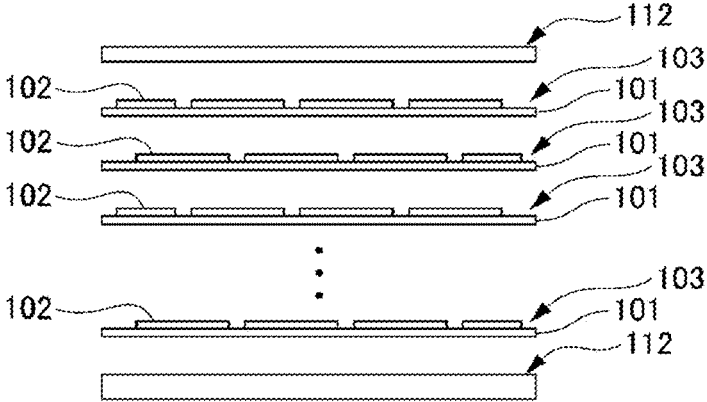
FIGS. 5A to 5D are drawings illustrating a multilayer body producing step S1, a base electrode layer forming step S2, and a first plating layer forming step S3.

Then, as shown in FIG. 5A, a plurality of the material sheets 103 are laminated so as to be in a state where the conductive patterns 102 are oriented in the same direction and the conductive patterns 102 of the adjacent material sheets 103 are shifted by half pitch from each other in the width direction. Further, a ceramic green sheet 112 for an outer layer portion serving as the outer layer portion 12 is laminated on each of both sides of the plurality of laminated material sheets 103.

Figure 5B:
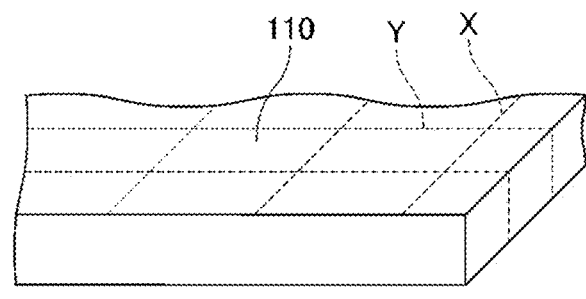

The plurality of laminated material sheets 103 and the ceramic green sheets 112 for an outer layer portion are thermal-bonded to form a mother block 110 shown in FIG. 5B.

Figure 5C:
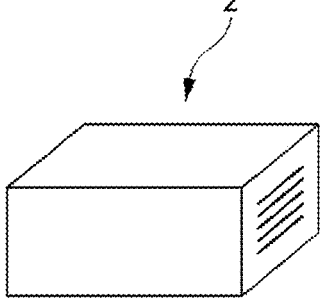

Next, the mother block 110 is cut along cutting lines X and cutting lines Y crossing the cutting lines X shown in FIG. 5B, producing a plurality of multilayer bodies 2 shown in FIG. 5C.

Base Electrode Layer Forming Step S2

Then, a conductive paste including a conductive metal is applied to the end surface C of each of the multilayer bodies 2 and baked to form the base electrode layer 30. The base electrode layer 30 is formed so as to cover not only the end surfaces C at both sides of the multilayer body 2 but also extend to the main surface A and the side surface B side of the multilayer body 2 and cover end surface C-side portions of the main surface A.

First Plating Layer Forming Step S3

Figure 5D:
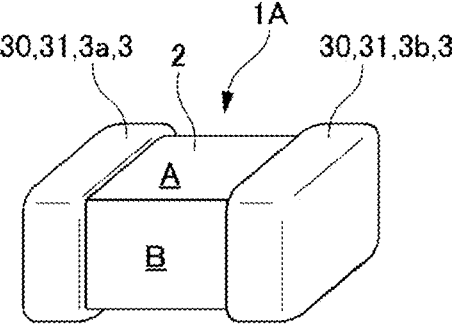

Next, the first nickel plating layer 31a on the outer periphery of the base electrode layer 30 and the first tin plating layer 31b disposed on the outer periphery of the first nickel plating layer 31a are formed, forming the multilayer body main body 10 shown in FIG. 5D.

Bump Disposing Step S4

A paste 44 for providing a bump serving as a bump material is prepared. The paste 44 for providing a bump includes, in terms of % by weight, about 86.5% by weight or more and about 94.1% by weight or less of metal powders M including any one of silver, copper, or nickel and having a median diameter D50 of about 2 μm or more and about 10 μm or less, about 1.13% by weight or more and about 6.38% by weight or less of an epoxy resin, about 0.90% by weight or more and about 5.06% by weight or less of a phenol resin, about 0.0113% by weight or more and about 0.0638% by weight or less of imidazole, and about 1.48% by weight or more and about 3.85% by weight or less of solvent so that a total is 100%.

Also, the paste 44 for providing a bump includes, in terms of % by volume, about 45.3% by volume or more and about 64.9% by volume or less of the metal powders including any one of silver, copper, or nickel and having a median diameter D50 of about 2 μm or more and about 10 μm or less, about 5.94% by volume or more and about 25.5% by volume or less of an epoxy resin, about 4.56% by volume or more and about 19.5% by volume or less of a phenol resin, about 0.0621% by volume or more and about 0.266% by volume or less of imidazole, and about 8.31% by volume or more and about 24.5% by volume or less of solvent so that a total is 100%. Examples of the solvent include diethylene glycol monobutyl ether, diethylene glycol monoethyl ether, and diethylene glycol monomethyl ether.

The metal powders M include any one of silver, copper, or nickel, and a copper metal powder or an ally powder of copper and nickel is coated with silver. In addition, the metal powders M include a tin metal powder. The metal powders M have a median diameter D50 of about 2 μm or more and about 10 μm or less.

Figures 6A, 6B, 6C, 6D:
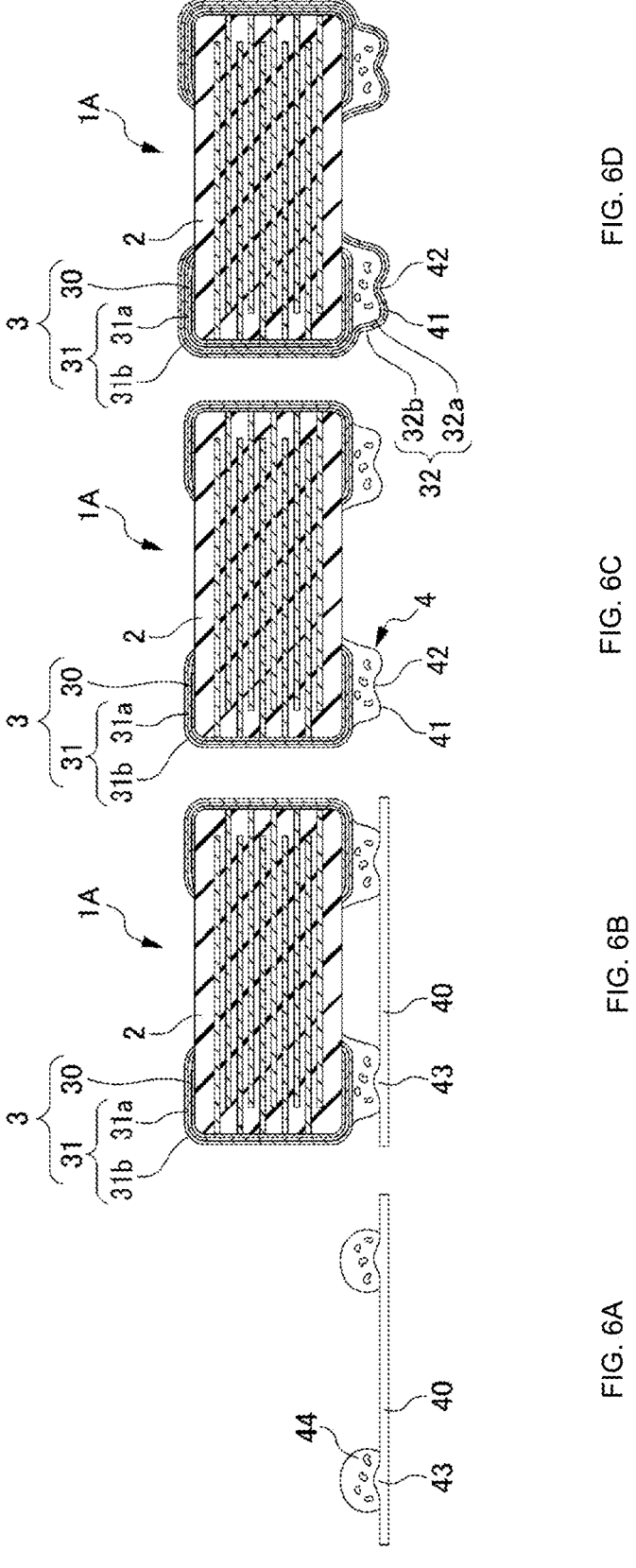
FIGS. 6A to 6D are drawings illustrating a bump disposing step S4 and a second plating layer forming step S5.

In forming the bumps 4, for example, a holding substrate 40 as shown in FIGS. 6A to 6D is used. As shown in FIG. 6A, the holding substrate 40 in the present example embodiment includes a projecting portion 43 at a position corresponding to each of the central portions 42 at the positions where the paste 44 for providing a bump is located.

The paste 44 for providing a bump is formed on the holding substrate 40 by a screen printing method, a dispensing method, or the like.

Thus, the paste 44 for providing a bump has a shape in which the central portion 42 in the length direction L is recessed more than the end surface side portion 41 on the end surface C side because the projecting portion 43 is formed as shown in FIG. 6A. That is, the paste 44 for providing a bump has a shape in which the end surface side portion 41 on the end surface C side in the length direction L projects to the outside in the lamination direction T, which is a lower portion in the drawing, more than the central portion 42 located nearer to the central side than the end surface side portion 41 in the length direction L.

Next, as shown in FIG. 6B, the capacitor main body 1A is mounted on the outer periphery of the holding substrate 40 in a state where the second main surface A2 side faces the holding substrate 40. In this case, the outer electrode layer 3 of the capacitor main body 1A is aligned with the paste 44 for providing a bump, and the paste 44 for providing a bump is adhered to the capacitor main body 1A.

In this state, a heating step is performed. Consequently, at least a portion of the metals in the paste forms an intermetallic compound, and solidification takes place, thereby forming the bumps 4 in a state of being joined to the capacitor main body 1A and the respective outer electrode layers 3.

Then, the capacitor main body 1A is isolated together with the bumps 4 from the holding substrate 40, producing a state shown in FIG. 6C.

Second Plating Layer Forming Step S

Next, the second nickel plating layer 32a is formed on a portion, where the first tin plating layer 31b is exposed in the capacitor main body 1A, and the outer periphery of each of the bumps 4, and further the second tin plating layer 32b is formed on the outer periphery of the second nickel layer 32a. The multilayer ceramic capacitor 1 is produced by the steps described above.

Effects of Present Example Embodiment

As described above, the multilayer ceramic capacitor 1 of the present example embodiment uses a solder to mount the multilayer ceramic capacitor on the substrate. The solder is located between a substrate terminal and the bumps 4. Then, the solder is melted by heating to fix the multilayer ceramic capacitor 1 to the substrate. A portion of the melted solder extends around to the end surface C. The solder going around may be wetted and raised to a portion where the inner layer portion 11 is present.

Thus, vibration produced in the inner layer portion 11 of the multilayer ceramic capacitor 1 is transmitted to the substrate from the solder, and thus there is a possibility of decreasing the squeak preventing effect of the bumps 4.

However, in each of the bumps 4 of the present example embodiment, the end surface side portion 41 near the end surface C on the side, where the bump 4 is disposed, in the length direction L is projected more than the central portion 42 of the bump 4 to the outside in the lamination direction T.

Therefore, the end surface-side portion 41 of each of the bumps 4 is projected to the outside in the lamination direction T, and thus the solder can be prevented from being wetted and raised to a region of the end surface C, where the inner layer portion 11 is present. This can decrease the transmission of vibration, generated in the inner layer portion 11 of the multilayer ceramic capacitor 1, to the substrate from the solder and thus can prevent a decrease in the squeak preventing effect of the bumps 4, that is, can decrease the occurrence of squeaking.

Also, in the present example embodiment, each of the bumps 4 is located on the outside of the first plating layer 31. Therefore, for example, by using an existing multilayer ceramic capacitor in which the bump 4 is not formed and the first plating layer 31 is present, the multilayer ceramic capacitor 1 of the present application can be produced by forming the bump 4 on the multilayer ceramic capacitor.

Example embodiments of the present invention are described above, but the present invention is not limited to these example embodiments, and various modifications or combinations can be made within the scope of the present invention.

For example, the method for forming the bumps 4 each having a shape in which the end surface-side portion 41 is projected more than the central portion 42 is not limited to the method described above. For example, the mump 4 can be produced so that the paste 44 for providing a bump is coated on the main surface facing upward in the multilayer ceramic capacitor 1. In this case, when the paste 44 for providing a bump is more coated on the end surface-side portion 41 than on the central portion 42, the end surface-side portion 41 of each of the bumps 4 can be projected to the outside in the lamination direction T as in the example embodiment.

Also, each of the bumps 4 may be formed directly on the base electrode layer 30. In addition, the base electrode layer 30 and the bump 4 formed directly on the base electrode layer 30 may be coated with the second plating layer 32. That is, the multilayer ceramic capacitor 1 may have a configuration including the second plating layer 32 without including the first plating layer 31.

In this case, each of the bumps 4 is formed directly on the base electrode layer 30, and thus adhesion between the base electrode layer 30 and the bump 4 is improved.

In addition, the multilayer ceramic capacitor 1 of the example embodiments includes the base electrode layer 30 on which the first plating player 31 is located, and the second plating layer 32 which covers the outer periphery of the bump 4, but the multilayer ceramic capacitor 1 is not limited to this and need not include the second plating layer 32.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
a multilayer body including a dielectric layer and an inner electrode layer alternately laminated;
an outer electrode layer on each of two end surfaces at both ends in a length direction perpendicular to a lamination direction of the multilayer body so as to cover end surface sides of two main surfaces at both ends in the lamination direction of the multilayer body and end surface sides of two side surfaces in a width direction perpendicular to the lamination direction and the length direction and which includes a base electrode layer connected to the inner electrode layers; and
a bump on each of the two end surface sides of one of the two main surfaces of the multilayer body to hold therebetween the base electrode layer, covering a main surface side, and including a resin and a metal; wherein in each of the bumps, the end surface-side portion adjacent to the end surface on the side, where the bump is located, projects more than a central portion of the bump to an outside in the lamination direction; and
a difference in thickness between the end surface-side portion and the central portion in the lamination direction is about 5% or more and about 30% or less of the thickness of the end surface-side portion of the bump in the lamination direction.

2. The multilayer ceramic capacitor according to claim 1, wherein a metal occupies about 43% or more and about 91% or less of a total area of a section of the bump.

3. The multilayer ceramic capacitor according to claim 1, wherein a metal occupies about 60% or more to about 80% or less of a total area of a section of the bump.

4. The multilayer ceramic capacitor according to claim 1, wherein each of the outer electrode layers includes, on the end surface side, a nickel plating layer and a tin plating layer on an outer periphery of the nickel plating layer, and the nickel plating layer and the tin plating layer cover an outer periphery of the bump on the main surface side.

5. The multilayer ceramic capacitor according to claim 1, wherein
each of the outer electrode layers includes, from a base electrode layer side:
a first nickel plating layer on an outer periphery of the base electrode layer;
a first tin plating layer on an outer periphery of the first nickel plating layer;
a second nickel plating layer on an outer periphery of the first tin plating layer; and
a second tin plating layer on an outer periphery of the second nickel plating layer; and
the second nickel plating layer and the second tin plating layer cover an outer periphery of the bump on the main surface side.

6. A paste for a bump of the multilayer ceramic capacitor according to claim 1, the paste comprising:
about 86.5% by weight or more and about 94.1% by weight or less of a metal powder including any one of silver, copper, or nickel and having a median diameter D50 of about 2 μm or more and about 10 μm or less;
about 1.13% by weight or more and about 6.38% by weight or less of an epoxy resin;
about 0.90% by weight or more and about 5.06% by weight or less of a phenol resin;
about 0.0113% by weight or more and about 0.0638% by weight or less of imidazole; and
about 1.48% by weight or more and about 3.85% by weight or less of solvent so that a total is 100%.

7. The paste according to claim 6, wherein the copper includes copper coated with the silver, and an alloy powder of the copper and the nickel includes an alloy coated with the silver.

8. The paste according to claim 6, wherein the metal powder further includes tin.

9. The paste according to claim 6, wherein a metal occupies about 43% or more and about 91% or less of a total area of a section of the bump.

10. The paste according to claim 6, wherein a metal occupies about 60% or more to about 80% or less of a total area of a section of the bump.

11. A paste for a bump of the multilayer ceramic capacitor according to claim 1, the paste comprising:
about 45.3% by volume or more and about 64.9% by volume or less of a metal powder including any one of silver, copper, or nickel and having a median diameter D50 of about 2 µm or more and about 10 µm or less;

about 5.94% by volume or more and about 25.5% by volume or less of an epoxy resin;

about 4.56% by volume or more and about 19.5% by volume or less of a phenol resin;

about 0.0621% by volume or more and about 0.266% by volume or less of imidazole; and about 8.31% by volume or more and about 24.5% by volume or less of solvent so that a total is 100%.

12. The paste according to claim 11, wherein the copper includes copper coated with the silver, and an alloy powder of the copper and the nickel includes an alloy coated with the silver.

13. The paste according to claim 11, wherein the metal powder further includes tin.

14. The paste according to claim 11, wherein a metal occupies about 43% or more and about 91% or less of a total area of a section of the bump.

15. The paste according to claim 11, wherein a metal occupies about 60% or more to about 80% or less of a total area of a section of the bump.

* * * * *